United States Patent
Meister et al.

[19]

[11] Patent Number: 5,899,416
[45] Date of Patent: May 4, 1999

[54] RUDDER ASSEMBLY WITH A CONTROLLED BOUNDARY LAYER CONTROL FOR AN AIRCRAFT

[75] Inventors: Juergen Meister, Buxtehude; Juergen Pfennig, Marfeld; Werner Held, Syke, all of Germany

[73] Assignee: Daimler Chrysler Aerospace Airbus GmbH, Hamburg, Germany

[21] Appl. No.: 08/953,913

[22] Filed: Oct. 20, 1997

[30] Foreign Application Priority Data

Oct. 18, 1996 [DE] Germany .............................. 19643069

[51] Int. Cl.⁶ ........................................................ B64C 5/02
[52] U.S. Cl. ............................................. 244/207; 244/87
[58] Field of Search ............................. 244/87, 207, 208, 244/209, 130

[56] References Cited

U.S. PATENT DOCUMENTS

| | | | |
|---|---|---|---|
| 3,887,147 | 6/1975 | Grieb | 244/208 |
| 3,951,360 | 4/1976 | Anxionnaz | 244/209 |
| 4,813,631 | 3/1989 | Gratzer | 244/209 |
| 5,143,329 | 9/1992 | Coffinberry | 244/209 |
| 5,263,667 | 11/1993 | Horstman | 244/209 |
| 5,348,256 | 9/1994 | Parikh | 244/209 |
| 5,598,991 | 2/1997 | Nadkarni et al. | 244/203 |
| 5,740,991 | 4/1998 | Gleine et al. | 244/209 |
| 5,772,156 | 6/1998 | Parikh et al. | 244/209 |
| 5,779,196 | 7/1998 | Timar | 244/209 |

*Primary Examiner*—Galen L. Barefoot
*Attorney, Agent, or Firm*—W. F. Fasse; W. G. Fasse

[57] ABSTRACT

The boundary layer flow along the surface of an aircraft rudder assembly is controlled by suction applied through perforations primarily installed in the leading edge of the rudder assembly. The control is such that a laminar flow is enforced or at least such that any turbulent flow is displaced so that it begins downstream of the rudder assembly leading edge. Suction air chambers are arranged along the leading edge inside a nose box of the rudder assembly and these boxes are connected through air ducts and a valve system to an exhaust fan. The valve system and the exhaust fan are controlled by a central processing unit providing a flow controller for the suction in response to control signals produced from rated values and sensed actual valves to provide a uniform distribution of the suction along the leading edge of the rudder assembly. The suction system may be switched over to a de-icing mode by blowing warm air out through the perforations in a controlled manner.

20 Claims, 5 Drawing Sheets

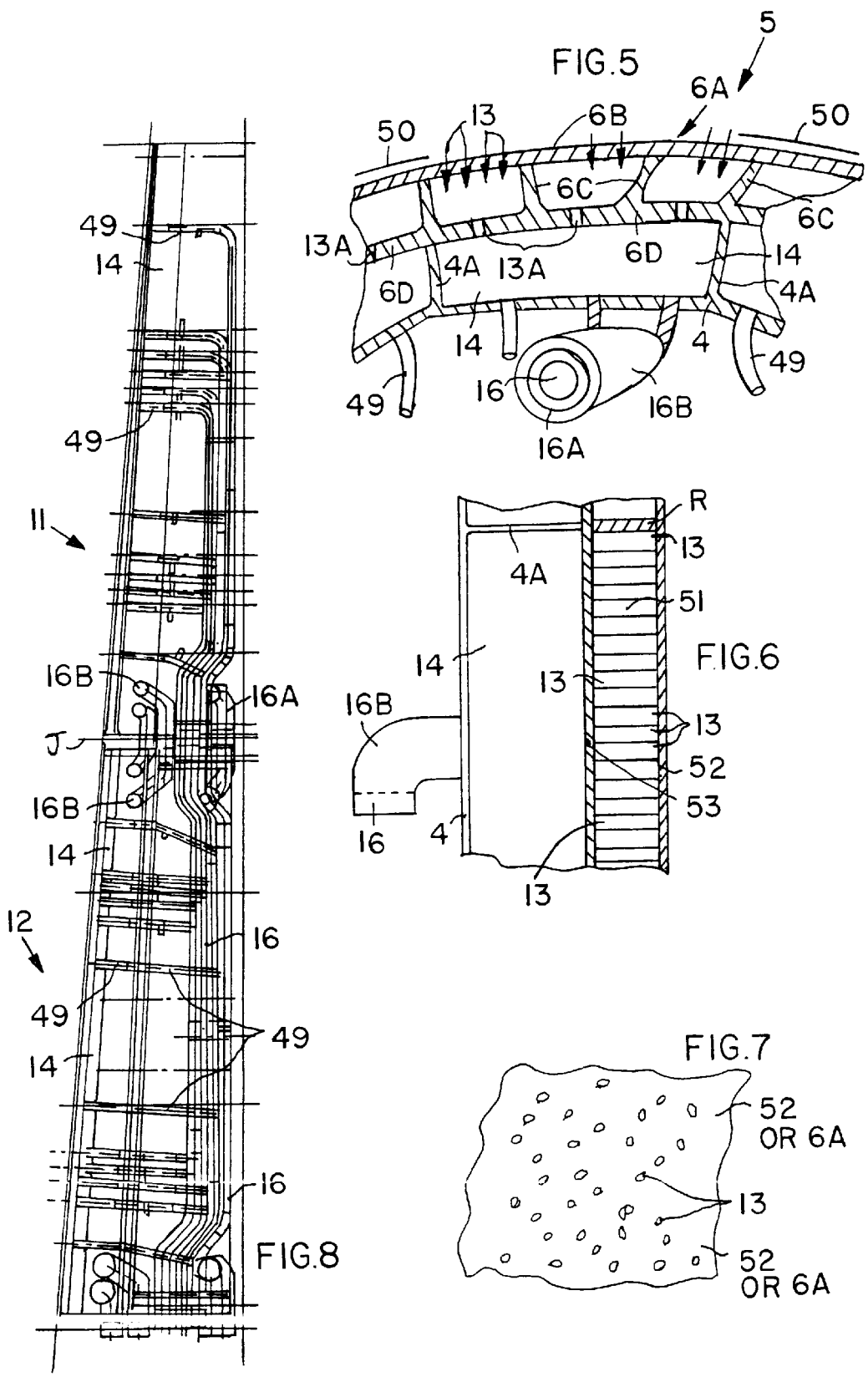

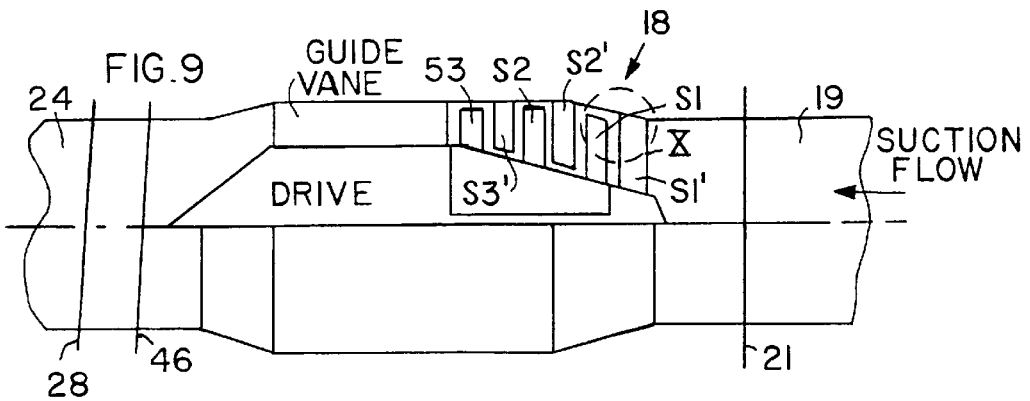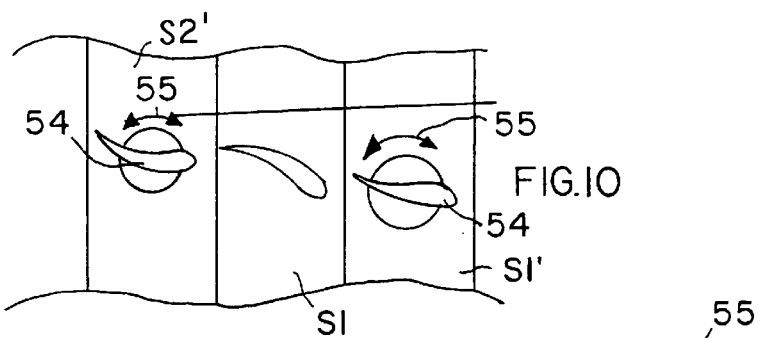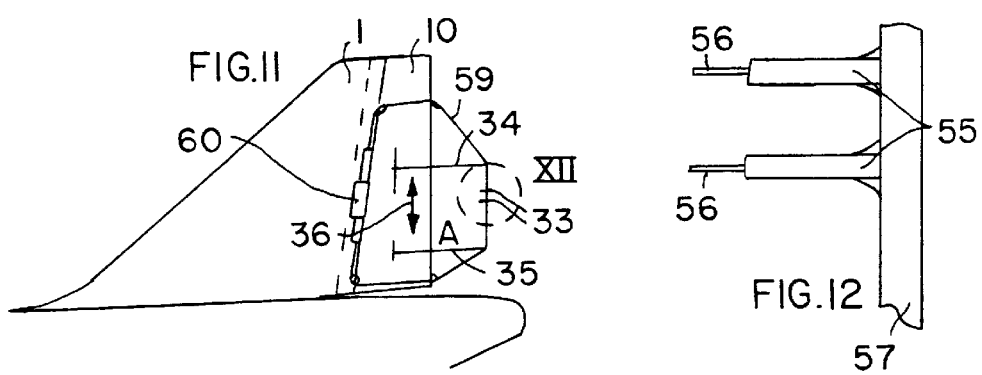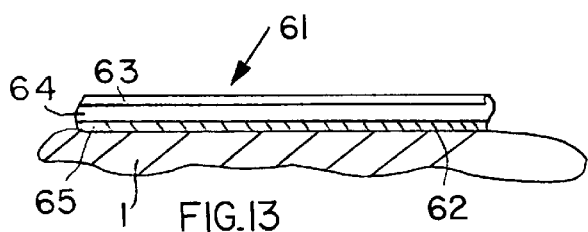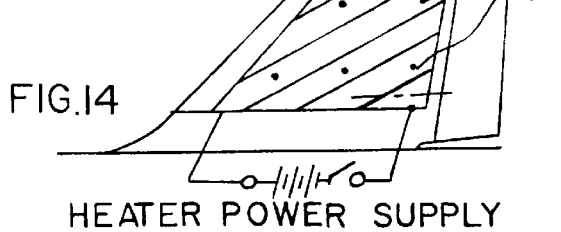

RUDDER ASSEMBLY WITH A CONTROLLED BOUNDARY LAYER CONTROL FOR AN AIRCRAFT

FIELD OF THE INVENTION

The invention relates to an aircraft rudder assembly provided with perforations connected to valves operated by a valve controller for a controlled removal of turbulent boundary layer air along the leading edge of the rudder assembly to maintain a substantially laminar flow. A reverse flow through the apertures can be used for de-icing.

BACKGROUND INFORMATION

It is known to maintain a laminar flow along an aircraft surface such as a wing surface by suction through apertures for influencing the boundary layer. The suction may be so-controlled that an artificial laminar flow is enforced and a turbulent flow is substantially avoided or at least delayed. Reference is made in this connection to an article entitled "Second Skin" (Zweite Haut) by H. L. Hillebrand in Flug Revue, December 1985, pages 68 to 70 describing two efforts for controlling boundary layer flow.

The so-called "Lockheed structure" involves a sandwich construction of a wing portion formed of honeycomb sheets covered with a graphite epoxy skin which in turn is covered by a further thin skin provided with longitudinal slots extending cross-wise to the flow direction on the upper and lower side of the wing near the wing leading edge. Suction is produced inside of the wing chambers and air is sucked into the wing through the longitudinal slots. The extent of the suction is controlled by a control unit.

The so-called "Douglas structure" includes a perforated thin sheet metal layer of titanium applied to a fiberglass support structure. The perforations include a multitude of very small apertures which are closely spaced to each other. These apertures are in the wing and suction is applied to remove boundary layer air through these apertures.

It is also known from European Patent Publication EP 0,436,243 A2 (Rudolph et al.), published on Jul. 10, 1991, to use an anti-icing system of an aircraft also for laminar flow control. The aperture through which hot air is blown out can also be used for sucking air through the apertures into the wing for laminar flow control. The flow is reversed in the anti-icing mode or vice versa. Rudolph et al. do not provide an exact control of the air quantity to be sucked off nor of the air quantity to be blown out. Thus, neither the blowing operation nor the sucking operation can be adapted to the instantaneously prevailing flow conditions at the leading edge of the wing. The Rudolph system is not capable of avoiding boundary layer separation altogether because in the suction mode it is possible that air may flow out of the apertures from those chambers in which the suction is not applied and the pressure build up in any chamber may result in a chamber pressure larger than the outside pressure. The prior art does not deal with boundary layer flow control in a rudder assembly.

Reference is also made to Aeronautical Engineering, Jan. 27, 1937, pages 98 to 100 where an article entitled "Sucking off the Boundary Layer" by B. S. Shenstone describes original efforts for boundary layer control. Further reference is made to U.S. Pat. No. 5,141,182 (Coffinberry), issued Aug. 25, 1992; U.S. Pat. No. 5,125,597 (Coffinberry), issued Jun. 30, 1992; and U.S. Pat. No. 5,143,329 (Coffinberry), issued Sep. 1, 1992.

The above prior art leaves room for improvement.

OBJECTS OF THE INVENTION

In view of the foregoing it is the aim of the invention to achieve the following objects singly or in combination:

to construct a rudder assembly of an aircraft in such a way that a boundary layer flow control is achieved by a controlled suction flow while a controlled reverse flow through the same apertures prevents an ice formation on the rudder assembly, especially along its leading edge;

to precisely control the volume of suction air and the volume of blowing air for the purpose of achieving on the one hand a substantially laminar boundary layer flow and on the other hand using just enough air required for the de-icing in response to the prevailing conditions such as the external temperature;

to reduce the drag on the aircraft, particularly the drag on the rudder assembly to thereby save fuel and improve the eocnomy of a commercial aircraft, especially passenger aircraft;

to optimize the power of a suction fan used for the present purposes so that it will not significantly contribute to the fuel consumption;

to heat at least certain surface areas of the rudder assembly for monitoring with an infrared camera the effect of the present boundary layer control; and to provide a pitot comb downstream of the rudder for monitoring the boundary layer flow as influenced by the present boundary layer control on the rudder assembly.

SUMMARY OF THE INVENTION

The above objects have been achieved according to the invention by a rudder assembly which is characterized by a rudder inner frame and a rudder nose box forming a leading edge section secured to the inner frame. The frame and nose box are enclosed by an outer rudder skin. Perforations in the outer skin at least along the leading edge section permit a suction or blowing operation. For this purpose a plurality of air chambers are positioned in the rudder assembly preferably in the nose box along the leading edge, whereby the air chambers communicate on the one hand with the atmosphere through the perforations in the outer skin and on the other hand with an air collection manifold or plenum to which the air chambers are individually connected by a plurality of air ducts. At least one controllable flow first valve is provided in each of the air ducts. An air suction fan or compressor is connected with its suction port or suction inlet to the air manifold through an air channel. A plurality of flow condition sensors preferably at least a pressure sensor, a temperature sensor, and a flow volume or flow velocity sensor, is provided for each of the air ducts that connect the air chambers with the air collection manifold or plenum. The outputs of the at least one sensor or sensors is connected to a flow controller which may be part of a central processing unit having sensor inputs connected to the flow condition sensor or sensors. The flow controller provides valve control signals at its respective outputs to control the first valves for closing and opening the first valves in response to the flow condition values sensed by the sensors individually for each air duct and thus for each of said plurality of air chamber. In this manner an exact quantity or rather volume of boundary layer air is removed sufficiently for maintaining a laminar flow of the boundary layer along the surfaces of the rudder assembly. Excess suction is avoided. Similarly, a blowing out of excess de-icing air is avoided. Both these features contribute to the fuel economy of the aircraft.

Preferably, one controllable flow second valve is connected in the air channel between the air collection manifold and the suction input of the compressor or suction fan so that this valve may also be controlled by the flow controller in response to respective flow conditions. The controller is responsive to the instantaneous flow and other measured conditions and adapts the required airflow accordingly by controlling a plurality of valves.

BRIEF DESCRIPTION OF THE DRAWINGS

In order that the invention may be clearly understood, it will now be described, by way of example, with reference to the accompanying drawings, wherein:

FIG. 5 shows on an enlarged scale the detail V in FIG. 4 illustrating the wall construction of the nose box at the leading edge;

FIG. 6 illustrates on an enlarged scale the detail VI in FIG. 4 showing the wall construction of the nose box away from the leading edge;

FIG. 7 illustrates the apertures through the skin of the present rudder assembly illustrating detail VII in FIG. 4;

FIG. 8 shows a side view of tapping pipes and air ducts connected by the tapping pipes to the air chambers communicating through these pipes and ducts with an air collection manifold and through apertures with the atmosphere;

FIG. 9 is a schematic view of a three-stage suction fan preferably used according to the invention;

FIG. 10 shows on an enlarged scale compared to FIG. 9 the variability of the angular position of the stator blades of the suction fan of FIG. 9;

FIG. 11 shows schematically the location of a position adjustable pitot comb and its drive;

FIG. 12 shows a detail XII of FIG. 11;

FIG. 13 shows a sectional partial view of a surface heater for the present rudder assembly; and FIG. 14 shows the surface heater and temperature sensors attached to the present rudder assembly in a side view.

DETAILED DESCRIPTION OF PREFERRED EXAMPLE EMBODIMENTS AND OF THE BEST MODE OF THE INVENTION

Figure 1:
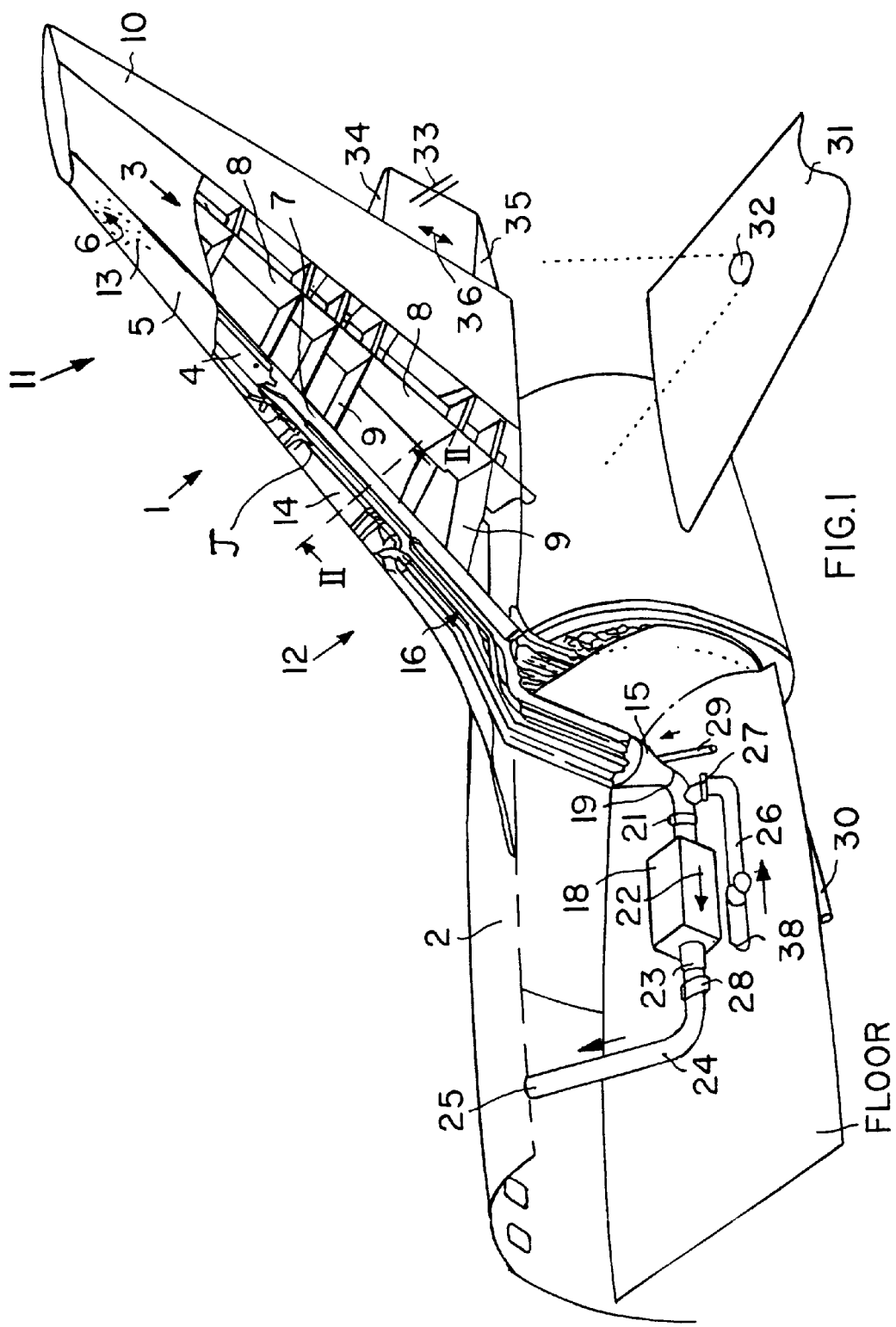
FIG. 1 is a perspective view of the tail section of an aircraft equipped with a rudder assembly and airflow control according to the invention.

FIG. 1 shows a rudder assembly 1 according to the invention secured to an aircraft body 2. The rudder assembly 1 comprises an inner frame 3, a nose box 4 forming a leading edge 5, and an outer skin 6 enclosing the inner frame 3 and the nose box 4 including the leading edge 5. The inner frame comprises a front spar 7, a rear spar 8, and ribs 9 conventionally interconnected. A rudder 10 is conventionally hinged to the rudder frame 3. The rudder assembly 1 may comprise several sections, for example an upper section 11 and a lower section 12 interconnected at a junction J, for example passing through the rib 9.

According to the invention the outer skin 6 is provided at least along the leading edge 5 with perforations 13 for maintaining an airflow. The nose box 4 is provided with air chambers 14 which communicate with the atmosphere through the perforations 13. These air chambers 14 are best seen in FIG. 4. The air chambers 14 further communicate with an air collection manifold 15 through a plurality of air ducts 16, one end of which is connected to the respective air chamber 14 and the other end of which is connected to the manifold or plenum chamber 15. Each of the air ducts 16 is provided with a controllable flow first valve 17 best seen in FIGS. 2 and 3. An air suction fan or compressor 18 is connected with its suction inlet port to an outlet of the manifold 15 through an air channel 19.

Figure 3:
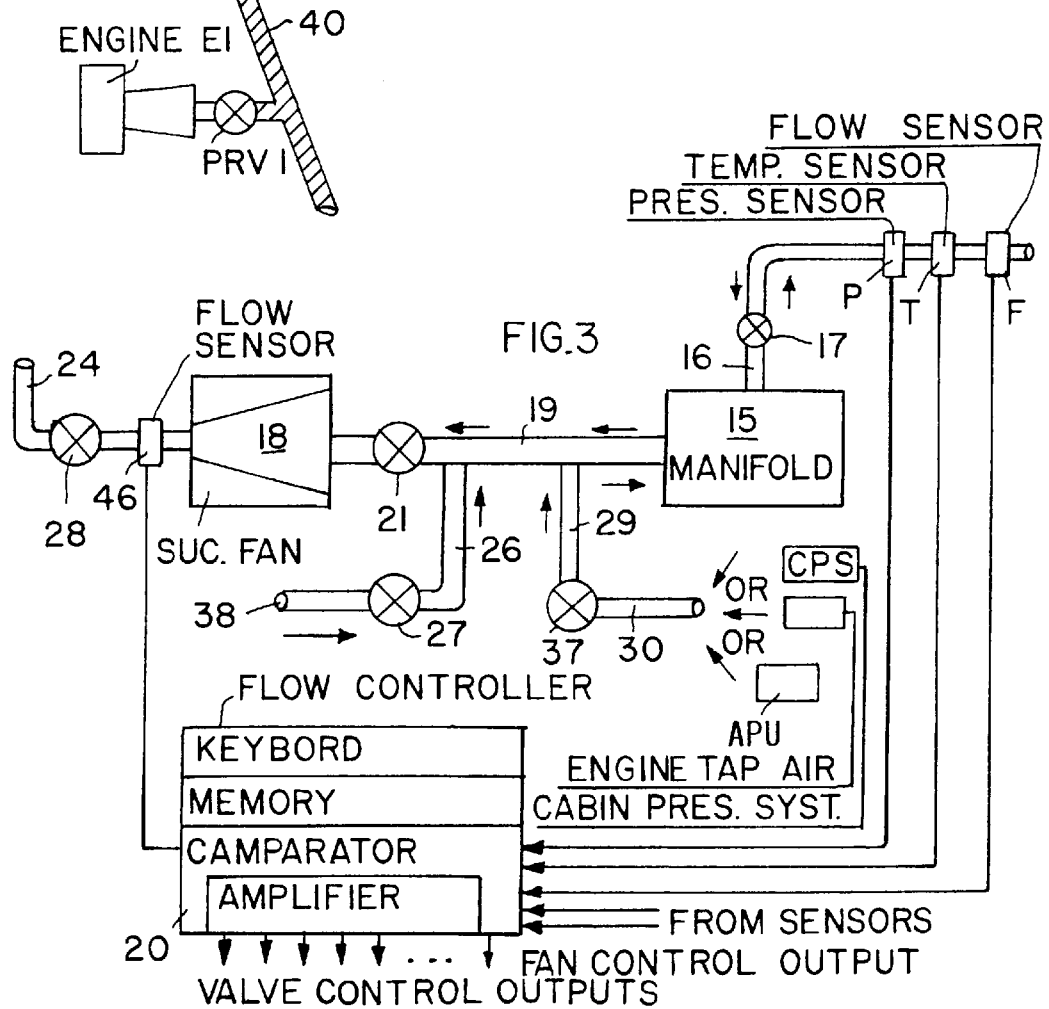
FIG. 3 shows in a block diagram the valves and the flow sensor positions including the flow controller.
Figure 4:
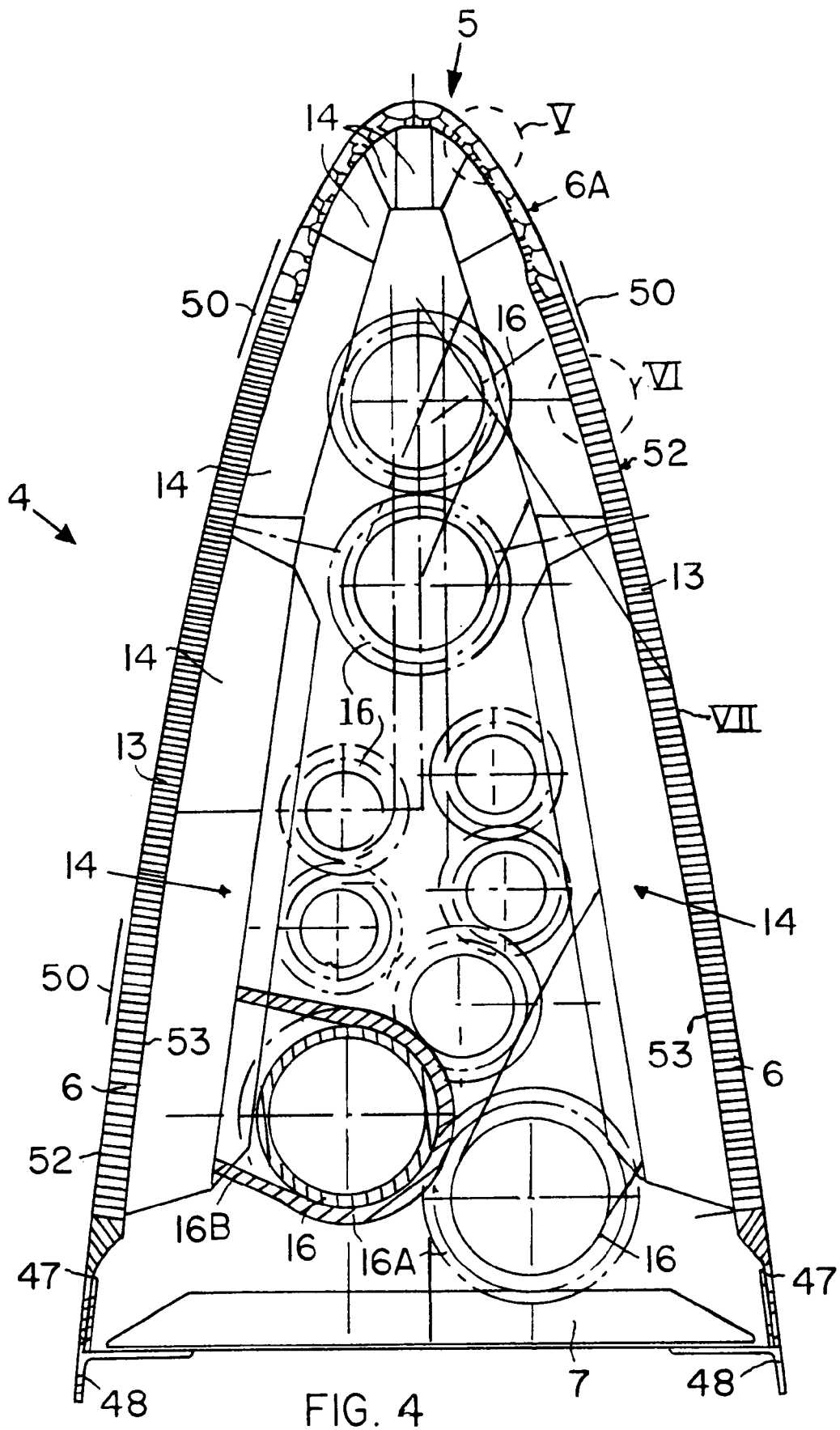
FIG. 4 is a sectional view along section line II—II in FIG. 1 showing the nose box of a rudder assembly according to the invention.

Flow condition sensors such as a pressure sensor P, a temperature sensor T, and a flow volume or flow velocity sensor F shown in FIG. 3 are constructed and arranged so that at least one sensor is provided for each respective air duct 16 sensing the flow condition values. Preferably, these sensors P, T, F are ascertaining the flow conditions in each respective air duct to provide corresponding output values representing these flow conditions to a flow controller 20 seen in FIG. 3. The flow controller 20 receives all these output values of the sensor through respective electrical conductors or pressure ducts. The flow controller 20 processes the received signals to provide respective electrical valve control outputs or signals connected to the respective controllable first valves 17 for closing and opening said first valves in response to the measured or sensed flow condition values sensed by the sensors P, T, F.

Referring further to FIG. 1, at least one controllable flow second valve 21 is positioned in the air channel 19, preferably at the suction port of the suction fan 18, whereby the second controllable valve 21 is positioned upstream of the fan 18 as viewed in a suction flow direction 22. The fan 18 has a discharge port 23 connected through an air outlet channel 24 to an air discharge port 25 passing through the aircraft wall preferably at a location where the pressure coefficient $C_P$ is low due to the shape of the aircraft body wall at the location of the outlet 25.

A by-pass air conduit 26 is connected to the air channel 19, preferably at a point upstream of the second valve 21 as viewed in the suction flow direction 22. A controllable flow by-pass third valve 27 is positioned for controlling a by-pass airflow through said by-pass conduit 26 into the air channel 19. An air inlet 38 of the by-pass conduit 26 passes through the aircraft wall just as the compressor discharge port 25.

A controllable flow fourth valve 28 is preferably positioned in the air outlet channel 24 downstream of the fan discharge port 23.

Referring further to FIG. 1, an air feeder tube 29, 30 is connected for supplying de-icing air into the manifold 15 and through the air ducts 16 and valves 17 into the air chambers 14 for blowing air out of the perforations 13 in the de-icing mode of operation to be described in more detail below.

FIG. 1 further shows a portion of the elevator assembly 31 carrying an infrared camera 32 for observing the rudder wall surfaces of the rudder assembly according to the invention regarding the effectiveness of the flow control according to the invention. Additionally, a pitot comb 33 is movably secured by brackets 34 and 35 to the rudder assembly 1 downstream of the rudder 10. The pitot comb 33 is adjustable up and down as indicated by the arrow 36 and as will be described in more detail below with reference to FIG. 11.

Figure 2:
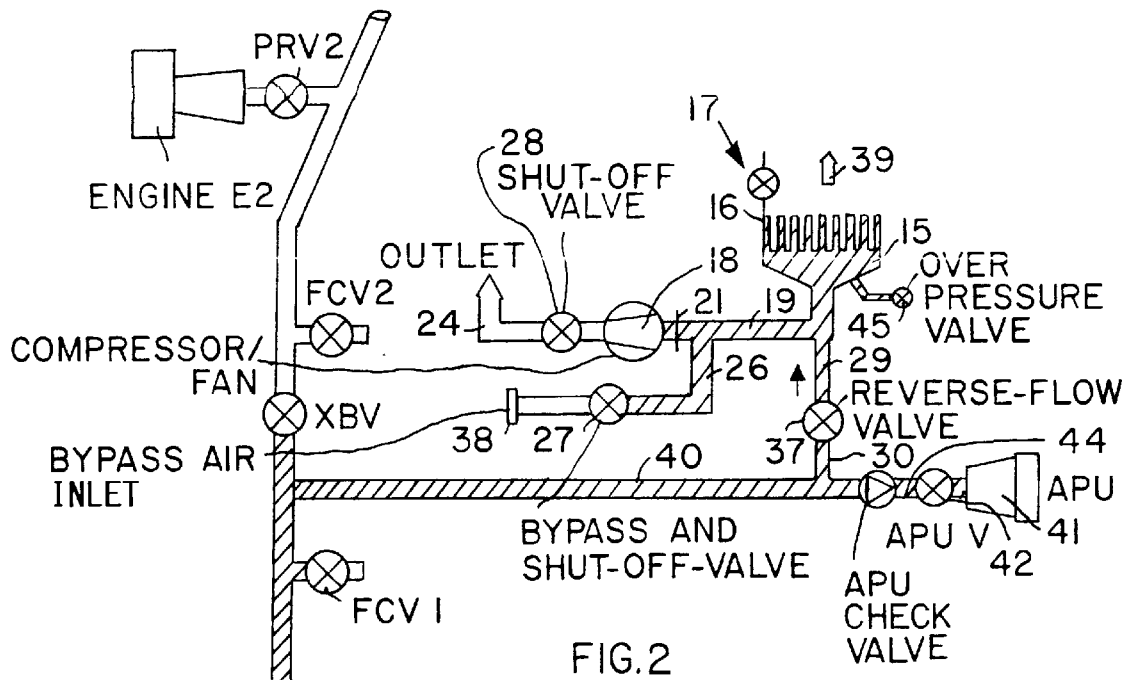
FIG. 2 illustrates schematically the suction fan with its by-pass and the air collection manifold or plenum chamber with a plurality of air ducts leading to suction chambers not seen in FIG. 2.

Referring to FIG. 2, the same components are provided with the same reference numbers as in FIG. 1. FIG. 2 shows the de-icing mode. Each of the air ducts 16 is provided with its own first flow control valve 17. However, only one such valve 17 is shown for simplicity's sake. The controllable flow second valve 21 is only shown by a line indicating its position in the air channel 19 upstream of the suction inlet port of the fan 18. The second valve 21 and the third valve 27 in the by-pass air conduit 26 are closed and so is the fourth valve 28 in the air outlet channel 24 of the suction fan 18 which is switched off in the de-icing mode. However, the first valves 17 are open and so is a controllable flow fifth valve 37 in the air feeder tubes 29, 30. Thus, warm air is supplied through the manifold 15, the open valves 17 and the air ducts 16 as indicated by the arrow 39, into the air chambers 14, whereby the warm air is caused to flow through the perforations 13, thereby de-icing the leading edge 5 of the rudder assembly 1.

In the shown example of FIG. 2, the reverse flow warm air comes from one of the engines E1. For this purpose a valve PRV1 is open to permit the warm air to flow into a pipeline 40 leading to the manifold 15 through the open valve 37. At this time valves FCV1 and XBV are closed. Additional air may flow from the auxiliary power unit 41 through an open valve 42 and a check valve 43 connecting the respective pipe line 44 from the auxiliary power unit 41 to the pipeline 40 which in turn is connected to the air feeder tube section 30. FIG. 2 shows that the warm air for de-icing purposes is obtained as tap air from the engine E1 and from the auxiliary power unit 41. However, the valve 42 may be closed so that the warm air is obtained only from the engine. Preferably, a check valve 43 is positioned between the pipe lines 40 and 44. Similarly, the valve PRV1 may be closed while the valve 42 is open, whereby only the auxiliary power unit 41 supplies the de-icing air. In both instances the reverse flow fifth valve 37 is open.

When the reverse flow fifth valve 37 is closed and the valve 21 open, the boundary layer control operation can continue, whereby the by-pass valve 27 may either be closed or open. If the by-pass valve 27 is open, air entering into the by-pass air inlet 38 can be supplied to the suction input of the compressor fan 18 in addition to air sucked through the apertures 13 for keeping the suction fan or compressor 18 at a stable working point or level. The output valve or shut-off valve 28 is open during the suction mode of the system.

FIG. 2 also shows a pressure relief valve 45 connected to the manifold 15 to relieve excess pressure from the manifold.

Referring to FIG. 3 again the same components are provided with the same reference numbers. However, FIG. 3 shows the above mentioned sensors P for measuring pressure, T for measuring temperature, and F for measuring fluid volume or fluid velocity. Each of the air ducts 16 is preferably provided with these three sensors. An additional sensor 46 is preferably positioned for sensing the fluid flow through the outlet channel 24 of the suction fan 18. All sensors are connected to respective inputs of the flow controller 20 which also has a keyboard for entering respective rated values into a memory which supplies these values to a comparator for comparing the rated values with respective measured values from the sensors P, T, F to provide valve control output signals at respective amplifier outputs. The sensor 46 is preferably a volume or velocity sensor.

As shown in FIG. 2, warm air may also be derived from the second engine E2 through the valve PRV2, whereby the valve FCV2 would be closed while the valve PRV2 is open. Similarly, the valve XBV would be open while the valves PRV1 and FCV1 would also be closed.

FIG. 4 shows a sectional view through the nose box 4. The outer skin or wall 6 of the nose box 4 is supported by the structure of the air chambers 14 and secured through brackets 47 to the front spar 7 which in turn is secured by further brackets 48 to the inner frame structure 3 of the rudder assembly as shown in FIG. 1. As shown in FIG. 4, the air ducts 16 may be distributed to fill the space between the air boxes 14. The upper ends of the air ducts 16 may be connected to the air chambers 14 through flexible hose sections 16A forming elbows 16B leading in an airtight manner into the respective air chambers 14. The volume of the air chambers 14 becomes smaller toward the leading edge 5. In order to assure a proper air removal by suction even from these smaller volume chambers near the leading edge 5, additional tap pipes or tapping pipes 49 are provided for connecting these smaller volume chambers 14 to the air ducts 16 as shown in FIG. 8. Generally, the tap pipes 49 have a narrower diameter than the air ducts 16. These tap pipes 49 are so distributed along the leading edge that a uniform suction is applied along the entire length of the leading edge 5.

FIG. 4 also shows that the leading edge 5 itself has a reinforced wall structure 6A, the detail V of which is shown in FIG. 5 to be described below. The nose box 4 has an overall cross-section approximately resembling that of a parabola. The wall 6 outside of the leading edge 5 has a honeycomb structure the detail VI of which is shown in FIG. 6 to be described below.

FIG. 5 shows the detail V of the reinforced construction of the leading edge 5 formed by the wall 6A having an outer sheet metal cover 6B provided with the perforations 13 symbolically shown by arrows. The sheet metal cover 6B is supported by reinforcing ribs 6C supported by a wall 6D provided with apertures 13A. The wall 6D in turn rests on the inner nose box structure 4 that forms the air chambers 14 communicating on the one hand through the apertures 13A and the perforations 13 with the atmosphere and on the other hand through the air ducts 16, 16A, 16B and/or through the tapping pipes 49 with the air collecting plenum or manifold 15. Where the cross-sectional flow area of the chambers 14 becomes smaller toward the leading edge 5, the connection of these smaller chambers to the air ducts 16 will predominantly be through a plurality of tapping pipes 49 connected to the air ducts 16 rather than by connecting the ducts 16 directly to the chambers 14. Attention will be paid to making these connections airtight. A boundary layer 50 is merely shown symbolically as a line.

FIG. 6 illustrates the detail VI of FIG. 4 on an enlarged scale. A honeycomb core 51 is sandwiched between an outer perforated sheet metal cover 52 and an inner perforated sheet metal layer 53. This sandwich structure is rigidly secured to the nose box structure 4 provided with separation walls 4A that form the plurality of air chambers 14 in the nose box 4. Reinforcing ribs R may pass through the honeycomb structure 51 to rigidly interconnect the sheet metal members 52 and 53 to each other and to the separation walls 4A. Each of the air chambers 14 is connected to at least one suction air duct 16 through the elbow 16B in an airtight manner. The elbow itself is preferably flexible.

FIG. 7 shows a view onto the outer surface of the rudder nose section illustrating the perforations 13 through the outer sheet metal or fiber composite material cover 52 or 6A. These perforations 13 are preferably made by drilling with a laser beam.

FIG. 8 has been adequately described above. In addition to the connection of the tapping pipes 49 to the chambers 14, FIG. 8 also shows the upper nose box section 11 and the lower nose box 12 interconnected to each other at a junction J.

FIG. 9 shows schematically the suction fan 18 with three rotor stages S1, S2 and S3 cooperating with respective stator sections S1', S2' and S3'. A fan control output at the flow controller 20 provides a control signal for controlling these compressor or fan stages individually in response to suction requirements provided by the sensors P, T, F and 46.

FIG. 10 shows on an enlarged scale the detail X of FIG. 9 for an alternative for the fan control. The stator stages S1', S2', . . . have position variable blades 54 having a variable blade angle as indicated by the arrows 55 controllable by the controller 20 in response to suction requirements.

In addition to or as an alternative control of the suction fan 18 the latter may have a variable r.p.m. also controllable by the controller 20 in response to suction requirements. When the r.p.m. and/or the blade angle are variable it may not be necessary to have individually controllable fan stages.

FIGS. 11 and 12 show the arrangement of the above mentioned pitot comb 33 positioned downstream of the rudder 10 as viewed in the flow direction of the boundary layer for monitoring the effect of the boundary layer control of the rudder assembly 1 according to the invention. The enlarged illustration of FIG. 12 shows the detail XII of FIG. 11. A plurality of pressure sensing pitot tubes 56 are mounted by tube mounts 55 to a carrier 57 which in turn is mounted to the brackets 34, 35 forming cantilever arms that hold the carrier 57 in a movable position downstream of the rear edge of the rudder 10. The carrier 57 with its pressure sensing pitot tubes 56 extends horizontally, namely perpendicularly to the plane of the drawing of FIG. 11. The carrier 57 with its tubes 56 is movable up and down by a drive 60 as indicated by the double arrow 36 in FIG. 11. The drive power may, for instance, be transmitted from the drive 60 to the carrier 57 by a cable drive transmission 59 running over rollers and connecting the carrier 57 to the drive 60.

FIGS. 13 and 14 illustrate a surface heater 16 positioned for heating at least a portion of the rudder assembly 1 to a constant temperature for monitoring by the infrared camera 32 positioned on the elevator section 31, whereby the effectiveness of the present boundary layer control by suction through the perforations may be ascertained and indicated. Specifically, the infrared camera provides information regarding the location where the laminar flow enforced by the controlled suction according to the invention is no longer laminar and tends to become turbulent. Further, signals measured by the camera may be supplied to the flow controller 20 for additionally influencing the control of the valves. The heat sensors 62 are so distributed over the surface of the rudder assembly downstream of the leading edge 5 that a uniform constant temperature is assured for observation by the camera 32. As shown in FIG. 13, the heater 61 is secured to the outer surface of the rudder assembly 1 through an insulating layer 65 to which a heating mat 64 is secured which in turn is covered by a protective layer or coating 63. FIG. 14 also shows a conventional power supply for the heater 61 that may be switched on and off as required.

When it becomes necessary to switch the valves and the suction fan from the suction mode which is applied during flight, to the de-icing mode which may be applied on the ground or in flight, the suction mode is terminated by switching the suction fan 18 off and first closing all valves. Then, the blowing mode is selected on the keyboard of the controller 20, whereby first the inlet valve 21 to the fan 18 and the valves 17 remain closed. However, the by-pass valve 27 is first opened to function as a vent to protect the system against a rapid pressure rise to avoid damages to the system. Then the bleed air valve 37 is opened so that bleed air may pass through the air feeder tubes 29 and 30. Then the valves 17 leading to the suction ducts 16 are brought by the controller 20 in a defined open position, whereupon the by-pass valve 27 is gradually closed to assure a gradual pressure increase within the system. The switch over from the blowing mode to the suction mode is similarly performed through the keyboard, whereby primarily an open loop control takes place. During operation the controller 20 performs primarily a closed loop control in response to the signals from the sensors after comparing with the stored rated signals.

By controlling the valves 21 and 28 it is possible to initially increase the r.p.m. of the fan 18 to its rated r.p.m. free of any load, thereby also saving energy. By placing the exit port 25 of the fan 18 where the $C_P$ value is low, air out of the fan will exit almost on its own substantially without added energy consumption, thereby also saving energy. Stabilizing the laminar flow along the surfaces of the rudder assembly also saves energy. However, a turbulent flow is maintained next to the rudder 10 and boundary layer separation is avoided next to the rudder 10 so as not to impair the effectiveness of the rudder function.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A rudder assembly for an aircraft, comprising a rudder inner frame (3), a rudder outer skin (6) enclosing said inner frame, and a rudder nose box (4) forming a leading edge (5) secured to said inner frame and enclosed by said rudder outer skin (6), perforations (13) through said outer skin (6) at least along said leading edge (5), a plurality of air chambers (14) positioned in said nose box, said air chambers (14) communicating through said perforations (13) with air outside said rudder assembly, an air collection manifold (15), a plurality of air ducts (16) individually connecting said plurality of air chambers (14) to said air collection manifold (15), a controllable flow first valve (17) in each of said air ducts (16), an air suction fan (18) having a suction inlet and an outlet, an air channel (19) connecting said air collection manifold (15) to said suction inlet of said suction fan (18), a plurality of flow condition sensors (P, T, F) positioned so that at least one sensor is provided for sensing flow condition values in each respective air duct (16) of said plurality of air ducts (16), a flow controller (20) having sensor inputs connected to said flow condition sensors, said flow controller further including valve control outputs connected to said controllable flow first valves (17) in said plurality of air ducts (16) for closing and opening said first valves (17) in response to said flow condition values sensed by said sensors for removing such a volume of boundary layer air individually through said plurality of air chambers (14) that a laminar boundary layer air flow is maintained on surfaces of said rudder assembly in response to said flow condition values.

2. The rudder assembly of claim 1, further comprising at least one controllable flow second valve (21) connected in said air channel (19) upstream of said air suction fan (18) as viewed in a suction flow direction (22).

3. The rudder assembly of claim 2, further comprising a by-pass air conduit (26) connecting said air channel (19) to a source of air, a controllable flow by-pass third valve (27) positioned for controlling a by-pass airflow through said by-pass conduit (26) into said air channel (19).

4. The rudder assembly of claim 1, further comprising an air discharge port (23), an air outlet channel (24) connecting said suction fan to an air discharge port (25), and a controllable flow fourth valve (28) in said air outlet channel (24) between said suction fan outlet and air discharge port (25).

5. The rudder assembly of claim 3, wherein said by-pass air conduit (26) is connected to said air channel (19) between said air collection manifold (15) and said second controllable valve (21) connected to said inlet of said suction fan, whereby a junction between said by-pass air conduit (26) and said air channel (19) is positioned upstream of said controllable flow second valve (21) as viewed in a suction flow direction through said air channel (19).

6. The rudder assembly of claim 1, wherein said rudder inner frame (3) comprises at least two inner frame sections including an upper frame section (11), a lower frame section (12), and a frame junction (J) between neighboring frame sections securing said frame sections to each other.

7. The rudder assembly of claim 1, wherein said leading edge (5) comprises at least two leading edge portions including an upper leading edge portion, a lower leading edge portion, and an edge junction between neighboring leading edge portions securing said leading edge portions to each other.

8. The rudder assembly of claim 1, wherein said plurality of flow condition sensors (P, T, F) comprises for each of said air ducts (16) several sensors including at least a pressure sensor (P), a temperature sensor (T), and a flow volume or flow velocity sensor (F) for providing respective actual values of pressure, temperature, and flow volume or flow velocity, said several sensors being connected to said sensor inputs of said flow controller (20), a memory in said flow controller for storing rated values of temperature, pressure, and flow volume or flow velocity values, and a comparator for comparing respective measured actual values and rated values with each other to provide valve control signals at said control outputs of said flow controller (20) connected to said controllable flow valves.

9. The rudder assembly of claim 1, wherein said rudder nose box (4) comprises a reinforcing structure (6A, 6B, 6C, 6D) including a sheet metal cover (6A) with perforations (13) and a wall (6D) with apertures (13A) in said wall (6D) for communicating said air chambers (14) through said perforations (13) and through said apertures (13A) with the atmosphere for a controlled airflow through said perforations (13) and through said apertures (13A).

10. The rudder assembly of claim 1, wherein said air chambers (14) are positioned in said rudder nose box (4) next to said perforations (13), and wherein said air chambers have chamber volumes that diminish toward said leading edge (5).

11. The rudder assembly of claim 1, wherein said suction fan (18) comprises a plurality of stages (S1, S2, . . . ), said flow controller (20) comprising a suction fan control output connected for individually controlling said suction fan stages in response to suction requirements ascertained by said sensors.

12. The rudder assembly of claim 1, wherein said suction fan (18) comprises position adjustable blades (54) having a variable blade angle (55) controllable by said flow controller (20) in response to suction requirements.

13. The rudder assembly of claim 8, wherein said suction fan has a variable r.p.m. controllable by said flow controller in response to suction requirements.

14. The rudder assembly of claim 9, further comprising air tapping pipes (49) connected to said air suction ducts (16) and to said air chambers (14), and wherein said air tapping pipes (49) are distributed along a length direction of said rudder assembly so that uniform suction is applied through said perforations (13) and through said apertures (13A) along said leading edge (5).

15. The rudder assembly of claim 3, wherein said suction fan comprises at least one output flow sensor (46) positioned for sensing an air output volume or velocity of said suction fan, said output flow sensor (46) being connected to said flow controller for providing a measured air output value, a memory in said flow controller (20) for storing a rated suction fan output value, a comparator for comparing said measured air output value with said rated suction fan output value to produce a control signal for said by-pass third valve (27) for controlling said by-pass airflow in closed loop fashion for maintaining a stable operational level of said suction fan (18).

16. The rudder assembly of claim 1, wherein said suction fan outlet port (25) passes through a wall of said aircraft to the atmosphere at a location where the pressure coefficient ($C_P$) is low.

17. The rudder assembly of claim 1, further comprising an air feeder tube (29, 30) connected at one end to said air manifold (15) and at another end to a source of warm pressurized air and at least one controllable reverse flow air feeder fifth valve (37) in said air feeder tube for feeding air outwardly through said perforations (13) when said suction fan (18) is switched off.

18. The rudder assembly of claim 17, wherein said controllable reverse flow air feeder fifth valve (37) connects said air feeder tube (29, 30) to any one of an engine (E1, E2) for tap air, an auxiliary power unit (41) for feeding bleed-air into said air manifold, and to an aircraft cabin pressurization system (CPS).

19. The rudder assembly of claim 1, further comprising at least one heater (60) positioned for heating at least a portion of said rudder assembly (1) to a constant temperature, and an infrared camera (32) positioned for monitoring an effectiveness of a boundary layer control by suction through said perforations (13).

20. The rudder assembly of claim 1, further comprising a pitot tube comb (55) positioned behind a trailing edge of said rudder assembly (1) for measuring air drag as controlled by suction through said perforations (13).

* * * * *